United States Patent
Jung et al.

(10) Patent No.: US 11,183,685 B2
(45) Date of Patent: Nov. 23, 2021

(54) METHOD FOR PREPARING POSITIVE ELECTRODE ACTIVE MATERIAL PRECURSOR FOR LITHIUM SECONDARY BATTERY

(71) Applicant: LG Chem, Ltd., Seoul (KR)

(72) Inventors: Won Sig Jung, Daejeon (KR); Sang Soon Choi, Daejeon (KR); Hyun Ah Park, Daejeon (KR)

(73) Assignee: LG Chem, Ltd.

( * ) Notice: Subject to any disclaimer, the term of this patent is extended or adjusted under 35 U.S.C. 154(b) by 133 days.

(21) Appl. No.: 16/476,983

(22) PCT Filed: May 24, 2018

(86) PCT No.: PCT/KR2018/005864
§ 371 (c)(1),
(2) Date: Jul. 10, 2019

(87) PCT Pub. No.: WO2019/004602
PCT Pub. Date: Jan. 3, 2019

(65) Prior Publication Data
US 2019/0355979 A1    Nov. 21, 2019

(30) Foreign Application Priority Data
Jun. 29, 2017 (KR) .................. 10-2017-0082711

(51) Int. Cl.
*H01M 4/36* (2006.01)
*H01M 4/525* (2010.01)
(Continued)

(52) U.S. Cl.
CPC ........... *H01M 4/364* (2013.01); *H01M 4/525* (2013.01); *H01M 10/052* (2013.01);
(Continued)

(58) Field of Classification Search
CPC ...... H01M 4/364; H01M 4/505; H01M 4/525; H01M 10/052; C01G 53/006; C01G 53/04; C01G 53/44
See application file for complete search history.

(56) References Cited

U.S. PATENT DOCUMENTS 10,483,536 B2    11/2019  Tamura et al.
2010/0310869 A1* 12/2010  Jahn ..................... C01G 53/006
                                                                 428/402
(Continued)

FOREIGN PATENT DOCUMENTS

CN    103904318 A    7/2014
CN    104979553 A    10/2015
(Continued)

OTHER PUBLICATIONS

International Search Report for Application No. PCT/KR2018/005864 dated Aug. 31, 2018, pp. 1-3.
(Continued)

*Primary Examiner* — Ula C Ruddock
*Assistant Examiner* — Mary Grace Byram
(74) *Attorney, Agent, or Firm* — Lerner, David, Littenberg, Krumholz & Mentlik, LLP (57) ABSTRACT

The present invention provides a method of preparing a positive electrode active material precursor for a lithium secondary battery, a method of preparing a positive electrode active material for a lithium secondary battery in which the positive electrode active material precursor prepared by using the above method is used, and a positive electrode for a lithium secondary battery and a lithium secondary battery which include the positive electrode active material.

11 Claims, 3 Drawing Sheets

(51) Int. Cl.
*H01M 10/052* (2010.01)
*C01G 53/04* (2006.01)
*H01M 4/505* (2010.01)
*C01G 53/00* (2006.01)

(52) U.S. Cl.
CPC ........... *C01G 53/006* (2013.01); *C01G 53/04* (2013.01); *C01G 53/44* (2013.01); *H01M 4/505* (2013.01)

(56) References Cited

U.S. PATENT DOCUMENTS

| | | | |
|---|---|---|---|
| 2013/0078520 A1 | 3/2013 | Toya et al. | |
| 2013/0202966 A1 | 8/2013 | Yu et al. | |
| 2014/0027670 A1 | 1/2014 | Sun et al. | |
| 2016/0056458 A1* | 2/2016 | Tamura | H01M 4/505 252/182.1 |
| 2016/0126548 A1* | 5/2016 | Schroedle | H01M 4/525 429/223 |
| 2016/0190579 A1* | 6/2016 | Sun | C01G 53/006 429/223 |
| 2017/0133677 A1* | 5/2017 | Ryoshi | C01G 53/006 |
| 2017/0288262 A1 | 10/2017 | Choi et al. | |
| 2018/0013129 A1* | 1/2018 | Lee | H01M 4/36 |
| 2018/0294477 A1 | 10/2018 | Shin et al. | |

FOREIGN PATENT DOCUMENTS

| | | | |
|---|---|---|---|
| CN | 105390670 A | 3/2016 | |
| CN | 103354958 B | 5/2017 | |
| JP | H07165428 A | 6/1995 | |
| JP | 2015508050 A | 3/2015 | |
| JP | 2016044120 A | 4/2016 | |
| KR | 100752703 B1 | 8/2007 | |
| KR | 20110083383 A | 7/2011 | |
| KR | 20130009739 A | 1/2013 | |
| KR | 20130078415 A | 7/2013 | |
| KR | 20160081452 A | 7/2016 | |
| KR | 20170063396 A | 6/2017 | |
| KR | 20170063420 A | 6/2017 | |
| WO | 2012093798 A2 | 7/2012 | |
| WO | 2016175597 A1 | 11/2016 | |
| WO | 2016204563 A1 | 12/2016 | |
| WO | WO-2016204563 A1 * | 12/2016 | ............ H01M 4/131 |
| WO | 2017095133 A1 | 6/2017 | |

OTHER PUBLICATIONS

Jason R. Croy et al., Prospects for Spinel-Stabilized, High-Capacity Lithium-Ion Battery Cathodes, Journal, Dec. 2016, pp. 1-13, Journal vol. 334, Elsevier, United States.

Chinese Search Report for Application No. 201880005580, dated Apr. 19, 2021, 2 pages.

* cited by examiner

METHOD FOR PREPARING POSITIVE ELECTRODE ACTIVE MATERIAL PRECURSOR FOR LITHIUM SECONDARY BATTERY

CROSS-REFERENCE TO RELATED APPLICATIONS

This application is a national phase entry under 35 U.S.C. § 371 of International Application No. PCT/KR2018/005864, filed May 24, 2018, which claims priority to Korean Patent Application No. 10-2017-0082711, filed Jun. 29, 2017, the disclosures of which are incorporated herein in their entirety by reference.

TECHNICAL FIELD

The present invention relates to a method of preparing a positive electrode active material precursor for a secondary battery, a method of preparing a positive electrode active material for a lithium secondary battery in which the positive electrode active material precursor prepared by using the above method is used, and a positive electrode for a lithium secondary battery and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal oxides have been used as a positive electrode active material of the lithium secondary battery, and, among these oxides, a lithium cobalt oxide of $LiCoO_2$ having a high operating voltage and excellent capacity characteristics has been mainly used. However, since the $LiCoO_2$ has very poor thermal properties due to an unstable crystal structure caused by lithium deintercalation and is expensive, there is a limitation in using a large amount of the $LiCoO_2$ as a power source for applications such as electric vehicles.

Lithium manganese oxides ($LiMnO_2$ or $LiMn_2O_4$), lithium iron phosphate compounds ($LiFePO_4$, etc.), or lithium nickel oxides ($LiNiO_2$, etc.) have been developed as materials for replacing the $LiCoO_2$. Among these materials, research and development of the lithium nickel oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery.

Accordingly, as a method to improve low thermal stability while maintaining the excellent reversible capacity of the $LiNiO_2$, $LiNi_{1-\alpha}Co_\alpha O_2$ ($\alpha$=0.1 to 0.3), in which a portion of nickel is substituted with cobalt, or a nickel cobalt manganese-based lithium composite metal oxide (hereinafter, simply referred to as "NCM-based lithium oxide"), in which a portion of nickel is substituted with manganese (Mn) and cobalt (Co), has been developed. Also, in order to address safety issues due to elution of metallic elements while having excellent output characteristics, a lithium transition metal oxide having a concentration gradient of a metal composition has also been proposed.

Typically, a method of preparing the positive electrode active material may include a method of preparing a positive electrode active material precursor using a continuous stirred tank reactor (CSTR) and a method of preparing a positive electrode active material precursor using a batch-type reactor. The continuous stirred tank reactor (CSTR) discharges a precursor composed of particles simultaneously while raw materials are added and co-precipitated, and, with respect to the batch-type reactor, raw materials are added according to a volume of the reactor and reacted for a predetermined time, and a precursor is discharged after the completion of the reaction.

In general, the CSTR method is advantageous in that control of a metal composition ratio is easy, but has limitations in that, since raw material input and product discharge are simultaneously and continuously performed, there may be variations in retention time and reaction time of the positive electrode active material precursors formed in the reactor and size and composition of the resulting particles may be non-uniform.

Thus, there is a tendency to adopt the batch-type method capable of facilitating particle size control and preparing a positive electrode active material precursor having a uniform particle size, but productivity may be significantly reduced in comparison to the CSTR method when the batch-type reactor is used.

PRIOR ART DOCUMENT

Patent Document (Patent Document 1) Korean Patent Application Laid-open Publication No. 10-2013-0078415

DISCLOSURE OF THE INVENTION

Technical Problem

An aspect of the present invention provides a method capable of not only preparing a positive electrode active material precursor in which particle size control is facilitated, a particle size is uniform, and a surface of the particle is uniform, but also significantly increasing productivity of the positive electrode active material precursor in a method of preparing a positive electrode active material precursor for a lithium secondary battery using a batch-type reactor.

Another aspect of the present invention provides a method of preparing a positive electrode active material having uniform particle size and surface.

Another aspect of the present invention provides a positive electrode and a lithium secondary battery which include the above-prepared positive electrode active material.

Technical Solution

According to an aspect of the present invention, there is provided a method of preparing a positive electrode active material precursor for a lithium secondary battery by using a batch-type reactor which includes adding a reaction solution including a first transition metal-containing solution, a second transition metal-containing solution, an ammonium ion-containing solution, and a basic aqueous solution to the batch-type reactor, but adding the reaction solution while continuously discharging a portion of the reaction solution in the reactor to the outside of the reactor when the batch-type reactor is full, wherein an initial input flow rate of the reaction solution added to the batch-type reactor satisfies following Equation 1, and a pH in the batch-type reactor satisfies following Equation 2:

$$1.5 \times V/t \leq \upsilon_1 + \upsilon_2 + \upsilon_3 \leq 10 \times V/t \quad \text{[Equation 1]}$$

wherein, in Equation 1,

V is a volume of the batch-type reactor, t is total reaction time (minutes), $\upsilon_1$ is a total initial input flow rate (mL/min) of the first transition metal-containing solution and the second transition metal-containing solution, $\upsilon_2$ is an initial input flow rate (mL/min) of the ammonium ion-containing solution, and $\upsilon_3$ is an initial input flow rate (mL/min) of the basic aqueous solution, and $$pH_0 - \{([Ni]_0 - [Ni]_{t1}) \times 0.05\} \leq pH_{t1} \leq pH_0 - \{([Ni]_0 - [Ni]_{t1}) \times 0.005\} \quad \text{[Equation 2]}$$

wherein, in Equation 2, $pH_{t1}$ is a pH in the reactor at time t1, $pH_0$ is an initial pH in the reactor, $[Ni]_0$ is a molar concentration of nickel (Ni) in the transition metal-containing solution initially added, and $[Ni]_{t1}$ is a molar concentration of Ni in the transition metal-containing solution added at time t1.

According to another aspect of the present invention, there is provided a method of preparing a positive electrode active material for a lithium secondary battery which includes mixing a lithium-containing raw material with a positive electrode active material precursor prepared by the method of preparing a positive electrode active material precursor for a lithium secondary battery, and sintering the mixed resultant.

According to another aspect of the present invention, there is provided a positive electrode for a lithium secondary battery and a lithium secondary battery which include a positive electrode active material prepared by the method of preparing a positive electrode active material.

Advantageous Effects

According to the present invention, particle size control is easier than a case where a conventional batch-type method is used, a positive electrode active material precursor for a lithium secondary battery having a uniform particle size may be prepared, and a low productivity problem, a disadvantage of the conventional batch-type method, may be solved. Thus, productivity of a positive electrode active material may be significantly increased.

In addition, since a pH in a batch-type reactor is controlled as in the present invention, positive electrode active material precursor particles having uniform surfaces without defects, such as nanoflakes, on the surfaces may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The present inventors have found that a positive electrode active material precursor having a uniform particle size and excellent surface characteristics may not only be obtained, but productivity of the positive electrode active material precursor may also be significantly increased by preparing the positive electrode active material precursor using a batch-type reactor but controlling an input flow rate of a reaction solution and a pH in the reactor to meet specific conditions, thereby leading to the completion of the present invention.

In the present invention, since the positive electrode active material precursor is prepared by using the batch-type reactor, reaction conditions, such as concentrations, temperature, and retention time of reactants in the reactor, are the same as those of a continuous stirred tank reactor (CSTR), and thus, a relatively uniform product without variation may be prepared.

Specifically, a method of preparing a positive electrode active material precursor for a lithium secondary battery of the present invention includes adding a reaction solution including a first transition metal-containing solution, a second transition metal-containing solution, an ammonium ion-containing solution, and a basic aqueous solution to a batch-type reactor, but adding the reaction solution while continuously discharging a portion of the reaction solution in the reactor to the outside of the reactor when the batch-type reactor is full, wherein an initial input flow rate of the reaction solution added to the batch-type reactor satisfies the following Equation 1, and a pH in the batch-type reactor satisfies the following Equation 2.

$$1.5 \times V/t \leq \upsilon_1 + \upsilon_2 + \upsilon_3 \leq 10 \times V/t \quad \text{[Equation 1]}$$

In Equation 1, V is a volume of the batch-type reactor, t is total reaction time (minutes), $\upsilon_1$ is a total initial input flow rate (mL/min) of the first transition metal-containing solution and the second transition metal-containing solution, $\upsilon_2$ is an initial input flow rate (mL/min) of the ammonium ion-containing solution, and $\upsilon_3$ is an initial input flow rate (mL/min) of the basic aqueous solution.

$$pH_0 - \{([Ni]_0 - [Ni]_{t1}) \times 0.05\} \leq pH_{t1} \leq pH_0 - \{([Ni]_0 - [Ni]_{t1}) \times 0.005\} \quad \text{[Equation 2]}$$

In Formula 2, $pH_{t1}$ is a pH in the reactor at time t1, $pH_0$ is an initial pH in the reactor, $[Ni]_0$ is a molar concentration of nickel (Ni) in the transition metal-containing solution initially added, and $[Ni]_{t1}$ is a molar concentration of Ni in the transition metal-containing solution added at time t1.

Hereinafter, the method of preparing a positive electrode active material precursor according to the present invention will be described in more detail.

First, a reaction solution including a first transition metal-containing solution, a second transition metal-containing solution, an ammonium ion-containing solution, and a basic aqueous solution is added to a batch-type reactor.

In this case, an initial input flow rate of the reaction solution including the first transition metal-containing solution, the second transition metal-containing solution, the ammonium ion-containing solution, and the basic aqueous solution to the batch-type reactor satisfies the following Equation 1:

$$1.5 \times V/t \le \upsilon_1 + \upsilon_2 + \upsilon_3 \le 10 \times V/t \qquad \text{[Equation 1]}$$

In Equation 1, V is a volume of the batch-type reactor, t is total reaction time (minutes), $\upsilon_1$ is a total initial input flow rate (mL/min) of the first transition metal-containing solution and the second transition metal-containing solution, $\upsilon_2$ is an initial input flow rate (mL/min) of the ammonium ion-containing solution, and $\upsilon_3$ is an initial input flow rate (mL/min) of the basic aqueous solution.

Specifically, when the initial reaction solution including the first transition metal-containing solution, the second transition metal-containing solution, the ammonium ion-containing solution, and the basic aqueous solution is added to the batch-type reactor at an initial input flow rate satisfying Equation 1, the reactor may be filled within time which is about 1.5 to 10 times faster than time typically required to fill the reactor, and more nucleus of positive electrode active material precursor particles may be formed within a short period of time in the same size reactor.

In a case in which the initial input flow rate of the reaction solution is less than a range of Equation 1, productivity may be reduced, and, in a case in which the initial input flow rate of the reaction solution is greater than the range of Equation 1, the particle nucleus may not be stably formed and particle size control may be difficult.

The first transition metal-containing solution and the second transition metal-containing solution may each independently include a cation of at least one transition metal selected from the group consisting of nickel, manganese, and cobalt, but concentrations of the transition metal cations included in the first transition metal-containing solution and the second transition metal-containing solution may be different.

The first transition metal-containing solution may include 50 mol % to 98 mol % of nickel, 1 mol % to 40 mol % of manganese, and 1 mol % to 40 mol % of cobalt, and the second transition metal-containing solution may include 20 mol % to 80 mol % of nickel, 1 mol % to 60 mol % of manganese, and 1 mol % to 60 mol % of cobalt. Specifically, the first transition metal-containing solution may be a solution in which a concentration of a nickel cation is higher than that of the second transition metal-containing solution. For example, the first transition metal-containing solution may include a nickel salt in an amount of 50 mol % to 98 mol %, preferably 60 mol % to 98 mol % or 70 mol % to 98 mol %, and more preferably 80 mol % to 98 mol % based on total transition metal salts, and the second transition metal-containing solution may include a nickel salt in an amount of 20 mol % to 80 mol %, preferably 40 mol % to 80 mol % or 50 mol % to 80 mol %, and more preferably 60 mol % to 80 mol % based on the total transition metal salts.

Also, the first transition metal-containing solution may be a solution in which a concentration of cation of at least one transition metal of manganese and cobalt is lower than that of the second transition metal-containing solution. For example, the first transition metal-containing solution may include a manganese salt and/or a cobalt salt in an amount of 1 mol % to 40 mol %, for example, 1 mol % to 30 mol % based on the total transition metal salts, and the second transition metal-containing solution may include a manganese salt and/or a cobalt salt in an amount of 1 mol % to 60 mol %, for example, 10 mol % to 50 mol % based on the total transition metal salts.

A precursor having a concentration gradient of the transition metal in the particle may be prepared by adjusting an input ratio of the first transition metal-containing solution and the second transition metal-containing solution in which the concentrations are different as described above. For example, the concentration gradient may be formed by gradually decreasing the input flow rate of the first transition metal-containing solution and gradually and complementarily increasing the input flow rate of the second transition metal-containing solution. For example, positive electrode active material precursor particles having a concentration gradient gradually changing from a center of the particle to a surface thereof may be formed by mixing the first transition metal-containing solution and the second transition metal-containing solution such that a mixing ratio of the first transition metal-containing solution and the second transition metal-containing solution is gradually changed from 100 vol %:0 vol % to 0 vol %:100 vol %.

The first transition metal-containing solution and the second transition metal-containing solution may each independently include acetic acid salts, nitrates, sulfates, halides, sulfides, hydroxides, oxides, or oxyhydroxides of the above transition metals, and these materials are not particularly limited as long as they may be dissolved in water.

For example, the cobalt (Co) may be included as $Co(OH)_2$, CoOOH, $Co(OCOCH_3)_2 \cdot 4H_2O$, $Co(NO_3)_2 \cdot 6H_2O$, or $Co(SO_4)_2 \cdot 7H_2O$ in the transition metal-containing solution, and at least one thereof may be used.

Also, the nickel (Ni) may be included as $Ni(OH)_2$, NiO, NiOOH, $NiCO_3$, $2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, or a nickel halide in the transition metal-containing solution, and at least one thereof may be used.

Furthermore, the manganese (Mn) may be included as a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; an oxyhydroxide, and manganese chloride in the transition metal-containing solution, and at least one thereof may be used.

Also, the first transition metal-containing solution and/or the second transition metal-containing solution may further include another metallic element (M) in addition to the nickel, manganese, and cobalt. In this case, M may include at least one selected from the group consisting of tungsten (W), molybdenum (Mo), chromium (Cr), aluminum (Al), zirconium (Zr), titanium (Ti), magnesium (Mg), tantalum (Ta), and niobium (Nb).

In a case in which the first transition metal-containing solution and/or the second transition metal-containing solution further includes the metallic element (M), a metallic element (M)-containing raw material may be selectively further added during the preparation of the first transition metal-containing solution and/or the second transition metal-containing solution.

As the metallic element (M)-containing raw material, at least one selected from the group consisting of an acetic acid salt, nitrate, sulfate, halide, sulfide, hydroxide, oxide, or oxyhydroxide containing the metallic element (M) may be used. For example, in a case in which the metallic element (M) is W, tungsten oxide may be used.

The basic aqueous solution may include at least one selected from the group consisting of NaOH, KOH, and $Ca(OH)_2$, and water or a mixture of water and an organic solvent (specifically, alcohol etc.), which may be uniformly mixed with the water, may be used as a solvent. In this case, a concentration of the basic aqueous solution may be in a range of 2 M to 10 M, for example, 2.5 M to 3.5 M. In a case in which the concentration of the basic aqueous solution is in a range of 2 M to 10 M, uniform sized precursor particles may be formed, precursor particle formation time may be fast, and yield may be excellent.

The ammonium ion-containing solution may include at least one selected from the group consisting of $NH_4OH$, $(NH_4)_2SO_4$, $NH_4NO_3$, $NH_4Cl$, $CH_3COONH_4$, and $NH_4CO_3$. In this case, water or a mixture of water and an organic solvent (specifically, alcohol etc.), which may be uniformly mixed with the water, may be used as a solvent.

The first transition metal-containing solution, the second transition metal-containing solution, the ammonium ion-containing solution, and the basic aqueous solution may be each independently added to the reactor or may be added to the reactor after some solutions or all solutions are premixed before adding to the reactor. For example, the reaction solution may be added in such a manner that the first transition metal-containing solution and the second transition metal-containing solution are added to the reactor after being mixed using a static mixer, and the ammonium ion-containing solution and the basic aqueous solution are directly added to the reactor.

Next, after a certain period of time, the reaction solution is simultaneously added to the reactor while continuously discharging a portion of the reaction solution in the reactor to the outside of the reactor when the batch-type reactor is full. The expression "the batch-type reactor is full" may denote that a volume of the added solutions is in a range of 90% to 100% of a volume of the batch-type reactor.

A discharge flow rate of the reaction solution may be the same as an input flow rate of the reaction solution. For example, in a case in which the input flow rate of the reaction solution is higher than the discharge flow rate of the reaction solution, a continuous reaction may not be possible due to an increase in solution level of the reactor, and, in a case in which the input flow rate of the reaction solution is lower than the discharge flow rate of the reaction solution, the continuous reaction may not be possible due to a decrease in the solution level of the reactor and an increase in solid content in the solution.

The discharge of the reaction solution, for example, may be performed by using a tube including a filter. Because of the filter included in the tube, the discharge of the positive electrode active material precursor particles to the outside of the reactor may be prevented and only the reaction solution may be selectively discharged to the outside of the reactor.

Also, a step of back blowing the tube at regular intervals during the discharge of the reaction solution may be further included. For example, the filter may be clogged because the positive electrode active material precursor particles are trapped in the filter during the discharge of the reaction solution. In order to prevent this, the tube is back blown by introducing distilled water or nitrogen into the tube in a direction opposite to the discharge direction of the reaction solution at regular intervals, and thus, the positive electrode active material precursor particles trapped in the filter may be blown into the reactor.

Since the reaction solution is simultaneously further added into the reactor while discharging the reaction-completed solution to the outside of the reactor as described above, the particles may further grow during the same reaction time in the same size reactor, and, accordingly, the yield of the precursor particles may be significantly increased.

A pH in the batch-type reactor may be controlled by the composition of Ni included in the transition metal-containing solution added into the reactor or a flow rate of the basic aqueous solution.

For example, a mixed solution, in which the first transition metal-containing solution and the second transition metal-containing solution are mixed through the static mixer, is added to the batch-type reactor, and a pH in the batch-type reactor may be controlled by a composition of Ni included in the mixed solution added to the reactor. For example, in a case in which the composition of Ni is in a range of 80 mol % to 99 mol %, for example, 85 mol % to 95 mol %, the pH may be in a range of 11.5 to 12, for example, 11.6 to 11.8, and, in this case, nucleus of the positive electrode active material precursor particles are formed.

Also, in a case in which the composition of Ni is in a range of 40 mol % to less than 80 mol %, for example, 60 mol % to 79 mol %, the pH of the reactor is adjusted to 10.5 to 11.5, for example, 11 to 11.4, and, in this case, the particles may grow.

Specifically, the pH in the batch-type reactor satisfies Equation 2 below.

$$pH_0-\{([Ni]_0-[Ni]_{t1})\times 0.05\} \leq pH_{t1} \leq pH_0-\{([Ni]_0-[Ni]_{t1})\times 0.005\} \quad \text{[Equation 2]}$$

In Formula 2, $pH_{t1}$ is a pH in the reactor at time t1, $pH_0$ is an initial pH in the reactor, $[Ni]_0$ is a molar concentration of Ni in the transition metal-containing solution initially added, and $[Ni]_{t1}$ is a molar concentration of Ni in the transition metal-containing solution added at time t1.

In Formula 2, the pH at time t1 may be close to $pH_0-\{([Ni]_0-[Ni]_{t1})\times 0.02\}$.

Specifically, the pH in the batch-type reactor may be controlled by an input flow rate of the basic aqueous solution, and the input flow rate of the basic aqueous solution satisfies the following Equation 3.

$$v_{3,0} \times \{1-(0.02\times([Ni]_0-[Ni]_{t2}))\} \leq v_{3,t2} < v_{3,0} \quad \text{[Equation 3]}$$

In Formula 3, $v_{3,t2}$ is an input flow rate of the basic aqueous solution at time t2, $v_{3,0}$ is an initial input flow rate of the basic aqueous solution, $[Ni]_0$ is a molar concentration of Ni in the transition metal-containing solution initially added, and $[Ni]_{t2}$ is a molar concentration of Ni in the transition metal-containing solution added at time t2.

Since a condition, in which the nucleus of the positive electrode active material precursor are formed, and a condition, in which the nucleus of the positive electrode active material precursor grow, are distinguished by controlling the pH as in Equations 2 and 3, the formation of the nucleus of the positive electrode active material precursor only occurs when the composition of Ni is in a range of 80 mol % to 99 mol %, that is, the pH is in a range of 11.5 to 12, and, thereafter, the growth of the particles only occurs when the composition of Ni is in a range of 40 mol % to less than 80 mol %, that is, the pH is in a range of 10.5 to 11.5. Thus, particle size and shape of the finally obtained positive electrode active material precursor are uniform and a dense positive electrode active material precursor may be prepared.

Also, in a case in which positive electrode active material precursor particles are prepared by changing pH conditions through changes in the composition of Ni as in the present invention, a positive electrode active material precursor having a uniform surface may be obtained without the growth of nanoflakes on the surface of the particle in the particle growth step.

Figure 1:
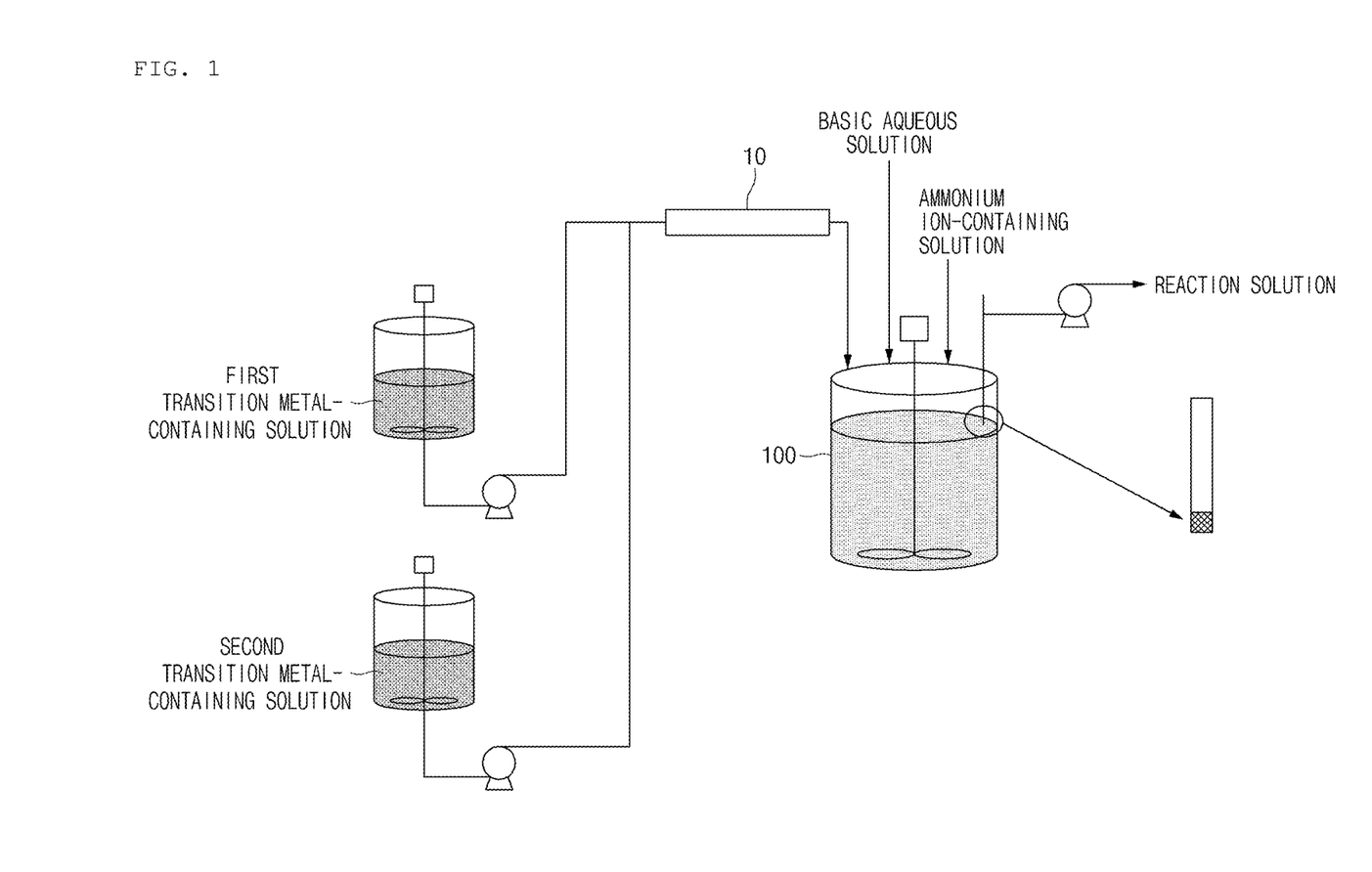
FIG. 1 schematically illustrates an apparatus for preparing a positive electrode active material precursor according to an embodiment of the present invention.

In this regard, an apparatus for preparing a positive electrode active material precursor according to an embodiment of the present invention is schematically illustrated in FIG. 1.

As illustrated in FIG. 1, the positive electrode active material precursor according to the present invention may be prepared by using the apparatus in which a container containing the first transition metal-containing solution and a container containing the second transition metal-containing solution are each connected to a static mixer, a batch-type reactor is connected to an outlet side of the static mixer, and a container containing the ammonium ion-containing solution and a container containing the basic aqueous solution are each connected to the batch-type reactor.

For example, the first transition metal-containing solution and the second transition metal-containing solution are mixed using the static mixer and then added to the reactor, and the ammonium ion-containing solution and the basic aqueous solution are directly added to the reactor. When the reactor is full, the reaction solution is continuously added into the reactor while a portion of the reaction solution in the reactor is discharged to the outside of the reactor through a tube by operating a vacuum pump connected to the tube including a filter, and thus, the positive electrode active material precursor according to the present invention may be prepared.

In order to prevent a filter clogging phenomenon caused by the positive electrode active material precursor particles during the discharge of the reaction solution, for example, after the operation of the vacuum pump connected to the tube is stopped at regular intervals and the positive electrode active material precursor particles trapped in the filter are blown into the reactor by introducing a small amount of distilled water or nitrogen in a direction opposite to the discharge direction of the reaction solution (batch-type reactor direction), discharge of the reaction solution to the outside of the reactor by again operating the vacuum pump connected to the tube may be further included.

The yield of the positive electrode active material precursor particles prepared by the method of preparing a positive electrode active material precursor according to the embodiment of the present invention may be improved by 200% to 1,100% in comparison to when positive electrode active material precursor particles are prepared by a conventional method using the same-sized batch-type reactor.

Also, the finally formed positive electrode active material precursor particles may be uniform particles having a $(D_{90}-D_{10})/D_{50}$ of 0.6 to 0.9, for example, 0.7 to 0.9.

In the present invention, average particle diameters, $D_{10}$, $D_{50}$, and $D_{90}$, of the positive electrode active material precursor particles may be respectively defined as particle diameters at 10%, 50%, and 90% in a cumulative particle diameter distribution. In the present invention, the particle diameter distribution of the positive electrode active material precursor particles, for example, may be measured by using a laser diffraction method. Specifically, with respect to the average particle diameters of the positive electrode active material, after particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameters at 10%, 50%, and 90% in a cumulative particle diameter distribution of the measurement instrument may then be calculated.

The present invention provides a method of preparing a positive electrode active material for a lithium secondary battery which includes a step of mixing the positive electrode active material precursor thus prepared with a lithium-containing raw material, and sintering the mixed resultant.

For example, lithium carbonate ($Li_2CO_3$) or lithium hydroxide (LiOH) may be used as the lithium-containing raw material, and the positive electrode active material precursor and the lithium-containing raw material may be mixed in a molar ratio of 1:1 to 1:1.15. In a case in which the lithium-containing raw material is mixed in a ratio less than the above range, capacity of the prepared positive electrode active material may be reduced, and, in a case in which the lithium-containing raw material is mixed in a ratio greater than the above range, since particles are sintered during a sintering process, the preparation of the positive electrode active material may be difficult, the capacity may be reduced, and separation of the positive electrode active material particles (inducing positive electrode active material impregnation phenomenon) may occur after the sintering.

The sintering may be performed in a temperature range of 800° C. to 1,000° C. In a case in which the sintering temperature is less than 800° C., since the raw materials may remain in the particles due to an insufficient reaction, high-temperature stability of the battery may be reduced and structural stability may be reduced due to decreases in volume density and crystallinity. In a case in which the sintering temperature is greater than 1,000° C., non-uniform growth of the particles may occur, and, since a size of the particles is excessively increased to reduce an amount of the particles per unit area, volume capacity of the battery may be reduced. In consideration of the particle size control, capacity, and stability of the prepared positive electrode active material particles and a reduction in lithium-containing by-products, the sintering temperature, for example, may be in a range of 850° C. to 950° C.

The sintering may be performed for 5 hours to 35 hours. In a case in which the sintering time is less than 5 hours, since the sintering time is too short, it may be difficult to obtain a high crystalline positive electrode active material, and, in a case in which the sintering time is greater than 35 hours, the size of the particles may be excessively increased and production efficiency may be reduced.

Also, the present invention provides a positive electrode for a lithium secondary battery which includes a positive electrode active material prepared by the above-described method.

Specifically, the positive electrode includes a positive electrode collector and a positive electrode active material layer which is disposed on at least one surface of the positive electrode collector and includes the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent and a binder in addition to the positive electrode active material.

In this case, the positive electrode active material may be included in an amount of 80 wt % to 99 wt %, for example, 85 wt % to 98 wt % based on a total weight of the positive electrode active material layer. When the positive electrode active material is included in an amount within the above range, excellent capacity characteristics may be obtained.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Furthermore, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

The negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move.

Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

NiSO$_4$, COSO$_4$, and MnSO$_4$ were mixed in water in amounts such that a molar ratio of nickel:cobalt:manganese was 90:5:5 to prepare a first transition metal-containing solution with a concentration of 2M, and, simultaneously, NiSO$_4$, COSO$_4$, and MnSO$_4$ were mixed in water in amounts such that a molar ratio of nickel:cobalt:manganese was 60:20:20 to prepare a second transition metal-containing solution with a concentration of 2M.

Containers containing the first and second transition metal-containing solutions were respectively connected to a static mixer, and a batch-type reactor (20 L) was connected to an outlet side of the static mixer. In addition, a 25 wt % NaOH aqueous solution and a 15 wt % NH$_4$OH aqueous solution were prepared and connected to the batch-type reactor, respectively.

4 L of deionized water was put in the batch-type reactor, the reactor was then purged with nitrogen gas at a rate of 5 L/min to remove dissolved oxygen in the water and create a non-oxidizing atmosphere in the reactor.

A mixed metal solution, in which the first transition metal-containing solution and the second transition metal-containing solution were mixed by the static mixer while gradually reducing an input flow of the first transition metal-containing solution from 100 vol % to 0 vol % throughout the reaction and gradually increasing an input flow of the second transition metal-containing solution from 0 vol % to 100 vol % throughout the reaction, the NaOH aqueous solution, and the NH$_4$OH aqueous solution were respectively added at rates of 12 mL/min, 7.5 mL/min, and 7.5 mL/min to the batch-type reactor and reacted for 30 minutes to form nucleus of nickel manganese cobalt-based composite metal hydroxide particles at a pH of 11.8.

Thereafter, a positive electrode active material precursor was prepared by performing a reaction for 30 hours while changing the flow rate of the NaOH aqueous solution as listed in Table 1. In this case, when the batch-type reactor was full during the reaction, while maintaining an input flow rate of the reaction solution, the reaction-completed solution was discharged at the same flow rate as the input flow rate. During the reaction time, the flow rate of the mixed metal solution of the first transition metal-containing solution and the second transition metal-containing solution was 12 mL/min, and the flow rate of the NH$_4$OH aqueous solution was 7.5 mL/min. Also, a concentration of Ni and a pH were respectively measured at 10 hours, 20 hours, and 30 hours immediately after the nucleation of the particles. The measurement results are listed in Table 1 below.

Example 2

A mixed metal solution, in which the first transition metal-containing solution and the second transition metal-containing solution were mixed by a static mixer, a NaOH aqueous solution, and a NH$_4$OH aqueous solution were respectively added at rates of 40 mL/min, 10 mL/min, and 10 mL/min to a batch-type reactor and reacted for 30 minutes to form nucleus of nickel manganese cobalt-based composite metal hydroxide particles.

Thereafter, a positive electrode active material precursor was prepared by performing a reaction for 30 hours while changing the flow rate of the NaOH aqueous solution as listed in Table 1. The positive electrode active material precursor was prepared in the same manner as in Example 1 except that, during the reaction time, the flow rate of the mixed metal solution of the first transition metal-containing solution and the second transition metal-containing solution was 40 mL/min, and the flow rate of the NH$_4$OH aqueous solution was 10 mL/min. Also, a concentration of Ni and a pH were respectively measured at 10 hours, 20 hours, and 30 hours immediately after the nucleation of the particles. The measurement results are listed in Table 1 below.

Comparative Example 1

A mixed transition metal-containing solution, in which the first transition metal-containing solution and the second transition metal-containing solution were mixed by a static mixer, a NaOH aqueous solution, and a NH$_4$OH aqueous solution were respectively added at rates of 4 mL/min, 1 mL/min, and 1 mL/min to a batch-type reactor to form nucleus of nickel manganese cobalt-based composite metal hydroxide particles. Thereafter, a positive electrode active material precursor was prepared in the same manner as in Example 1 except that, after the input flow rates of the above solutions were maintained and added until the reactor was full to grow the nickel manganese cobalt-based composite metal hydroxide particles, the reaction was terminated by stopping the addition of the solutions when the reactor was full, and a concentration of Ni and a pH were respectively checked at 10 hours, 20 hours, and 30 hours immediately after the nucleation of the particles as in the following Table 1.

TABLE 1

|  |  |  | 10 hours | 20 hours | 30 hours |
|---|---|---|---|---|---|
| Example 1 | [Ni]$_0$ = 90 mol % | [Ni]$_{t1}$ | 87 | 78 | 50 |
|  | pH$_0$ = 11.8 | pH$_{t1}$ | 11.7 | 11.5 | 11.2 |
|  | $v_{3,\,0}$ = 7.5 | $v_{3,\,t2}$ | 7.3 | 6.8 | 6.1 |
| Example 2 | [Ni]$_0$ = 90 mol % | [Ni]$_{t1}$ | 85 | 78 | 50 |
|  | pH$_0$ = 11.8 | pH$_{t1}$ | 11.65 | 11.4 | 11.15 |
|  | $v_{3,\,0}$ = 10 | $v_{3,\,t2}$ | 9.7 | 9.1 | 8.2 |
| Comparative Example 1 | [Ni]$_0$ = 90 mol % | [Ni]$_{t1}$ | 87 | 78 | 50 |
|  | pH$_0$ = 11.8 | pH$_{t1}$ | 11.8 | 11.8 | 11.8 |
|  | $v_{3,\,0}$ = 1 | $v_{3,\,t2}$ | 1 | 1 | 1 |

Comparative Example 2

A positive electrode active material precursor was prepared in the same manner as in Example 1 except that a reaction was performed by using a single composition of 80:10:10 as the transition metal-containing solution while the pH in the reactor was constantly maintained at 11.4 throughout the reaction.

Experimental Example 1: Positive Electrode Active Material Precursor Yield Check In order to compare productivities of the positive electrode active material precursors prepared in Examples 1 and 2 and Comparative Examples 1 and 2, amounts of the precursors prepared in Example 1 and 2 and Comparative Examples 1 and 2 were measured, and the results thereof are presented in Table 2 below.

TABLE 2

|  | Amount of precursor formed (kg) | Ratio of improvement in yield based on typical yield (Comparative Example 1) (%) |
|---|---|---|
| Example 1 | 2.3 | 209 |
| Example 2 | 12 | 1090 |
| Comparative Example 1 | 1.1 | 100 |
| Comparative Example 2 | 1.1 | 100 |

Referring to Table 2, with respect to Examples 1 and 2 in which the input rates of the solutions were increased according to the present invention and the reaction solution was added while a portion of the reaction solution in the reactor was continuously discharged to the outside of the reactor when the reactor was full, it may be confirmed that yields were significantly improved in comparison to that of Comparative Example 1 even if the same-sized reactor was used during the same period of time.

Experimental Example 2: Particle Size Distribution Check

In order to check particle size distributions of the positive electrode active material precursors prepared in Examples 1 and 2 and Comparative Example 1 and 2, particle diameters of the positive electrode active material precursors formed in Example 1 and 2 and Comparative Example 1 and 2 were measured using a Horiba LA 950V2 particle size analyzer, and the results thereof are presented in Table 3 below.

TABLE 3

|  | $D_{10}$ (μm) | $D_{50}$ (μm) | $D_{90}$ (μm) | $(D_{90} - D_{10})/D_{50}$ |
|---|---|---|---|---|
| Example 1 | 14.9 | 19.03 | 28.8 | 0.73 |
| Example 2 | 14.7 | 19.4 | 31 | 0.84 |
| Comparative Example 1 | 14 | 19.32 | 33.6 | 1.014 |
| Comparative Example 2 | 15.1 | 20.2 | 34.2 | 0.946 |

Referring to Table 3, since Examples 1 and 2 showed narrower particle size distributions than Comparative Examples 1 and 2, it may be understood that more uniform precursors were formed.

Figure 2A:
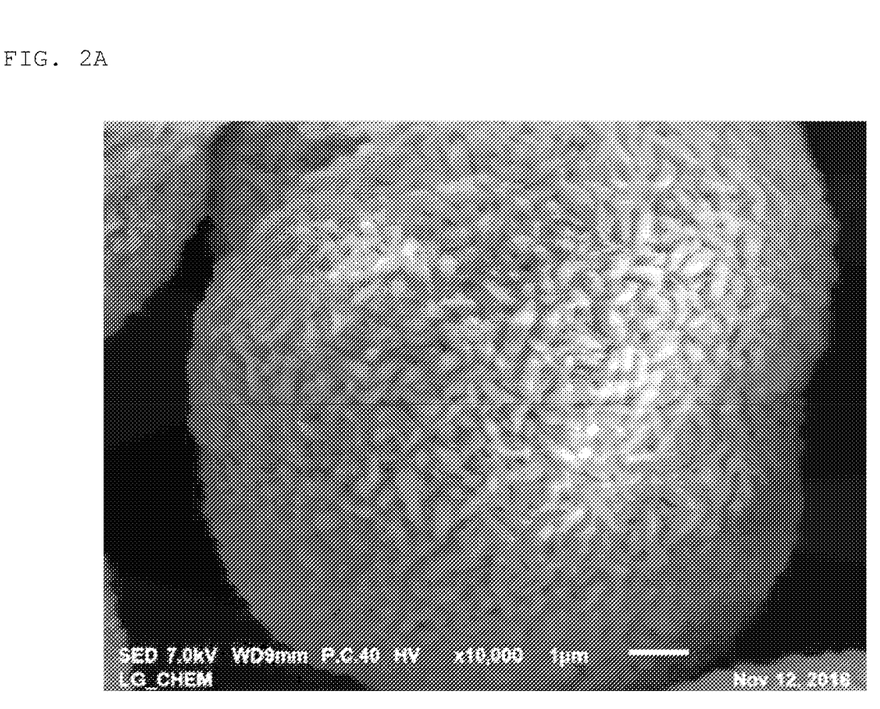
FIGS. 2A and 2B illustrate scanning electron microscope (SEM) images of surfaces of positive electrode active material precursors prepared in Example 1 and Comparative Example 2, respectively.
Figure 2B:
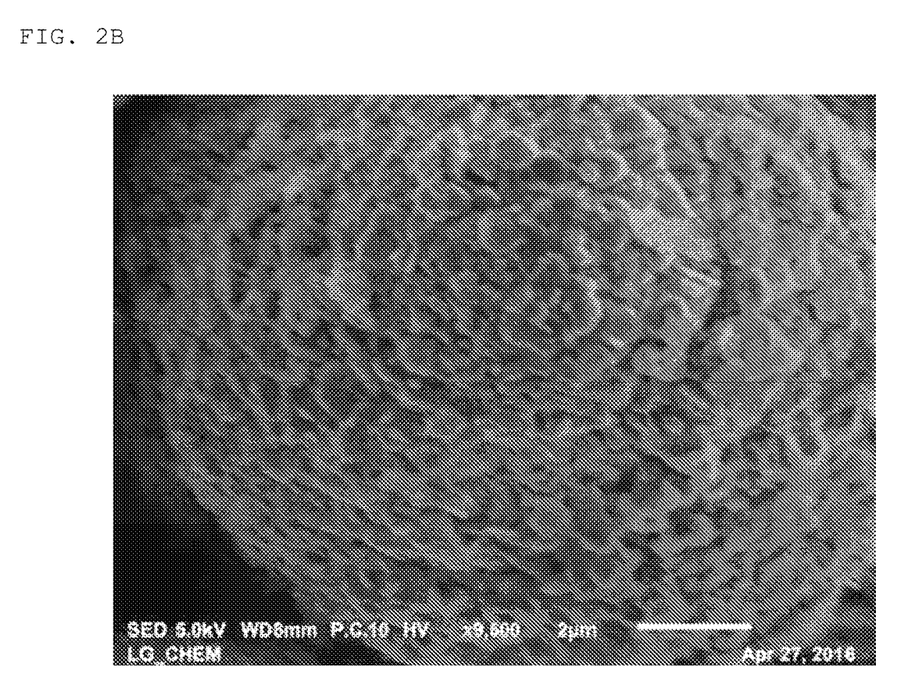

Experimental Example 3: Confirmation of Surface Characteristics of Positive Electrode Active Material Precursor In order to confirm surface characteristics of the positive electrode active material precursors prepared in Example 1 and Comparative Example 2, SEM images were taken. A surface of the positive electrode active material precursor prepared in Example 1 was uniform as in FIG. 2A, but nanoflakes were observed on a surface of the positive electrode active material precursor prepared in Comparative Example 2 as illustrated in FIG. 2B. This indicated that, with respect to Comparative Example 2, since the pH was maintained under the same condition without a change in the pH in nucleation and particle growth processes during the preparation of the positive electrode active material precursor particles, the particles did not grow properly.

DESCRIPTION OF THE SYMBOLS

10: Static mixer
100: Batch-type reactor

The invention claimed is:

1. A method of preparing a positive electrode active material precursor for a lithium secondary battery comprising:
adding a reaction solution including a first transition metal-containing solution, a second transition metal-containing solution, an ammonium ion-containing solution, and a basic aqueous solution to a batch reactor, wherein the adding of the reaction solution is done while continuously discharging a portion of the reaction solution in the batch reactor to outside of the batch reactor when the batch reactor is full, and
forming positive electrode active material precursor particles,
wherein the first transition metal-containing solution comprises 50 mol % to 98 mol % of nickel, 1 mol % to 40 mol % of manganese, and 1 mol % to 40 mol % of cobalt,
wherein the second transition metal-containing solution comprises 20 mol % to 80 mol % of nickel, 1 mol % to 60 mol % of manganese, and 1 mol % to 60 mol % of cobalt,
wherein an initial input flow rate of the reaction solution added to the batch reactor satisfies following Equation 1,
a pH in the batch reactor satisfies following Equation 2, and
an input flow rate of the basic aqueous solution satisfies following Equation 3:

$$1.5 \times V/t \leq v_1 + v_2 + v_3 \leq 10 \times V/t \quad \text{[Equation 1]}$$

wherein, in Equation 1, V is a volume of the batch reactor, t is total reaction time (minutes), $v_1$ is a total initial input flow rate (mL/min) of the first transition metal-containing solution and the second transition metal-containing solution, $v_2$ is an initial input flow rate (mL/min) of the ammonium ion-containing solution, and $v_3$ is an initial input flow rate (mL/min) of the basic aqueous solution, and $$pH_0 - \{([Ni]_0 - [Ni]_{t1}) \times 0.05\} \leq pH_{t1} \leq pH_0 - \{([Ni]_0 - [Ni]_{t1}) \times 0.005\} \quad \text{[Equation 2]}$$

wherein, in Equation 2,
$pH_{t1}$ is a pH in the batch reactor at time t1, $pH_0$ is an initial pH in the batch reactor, $[Ni]_0$ is a molar concentration of nickel (Ni) in the transition metal-containing solution initially added, and $[Ni]_{t1}$ is a molar concentration of Ni in the transition metal-containing solution added at time t1, $$v_{3,0} \times \{1-(0.02 \times ([Ni]_0-[Ni]_{t2}))\} \leq v_{3,t2} < v_{3,0} \quad \text{[Equation 3]}$$

wherein, in Formula $v_{3,t2}$ is an input flow rate of the basic aqueous solution at time t2, $v_{3,0}$ is an initial input flow rate of the basic aqueous solution, $[Ni]_0$ is a molar concentration of Ni in the transition metal-containing solution initially added, and $[Ni]_{t2}$ is a molar concentration of Ni in the transition metal-containing solution added at time t2,
wherein formation of a nucleus of positive electrode active material precursor particles occurs when the pH is in a range of 11.5 to 12, and growth of the positive electrode active material precursor particles occurs when the pH is in a range of 10.5 to 11.5.

2. The method of claim 1, wherein concentrations of the cation included in the first transition metal-containing solution and the second transition metal-containing solution are different.

3. The method of claim 1, wherein the first transition metal-containing solution and the second transition metal-containing solution are added to the batch reactor after being mixed using a static mixer.

4. The method of claim 1, wherein the ammonium ion-containing solution comprises $NH_4OH$, $(NH_4)_2SO_4$, $NH_4NO_3$, $NH_4Cl$, $CH_3COONH_4$, or $NH_4CO_3$.

5. The method of claim 1, wherein the basic aqueous solution comprises $NaOH$, $KOH$, or $Ca(OH)_2$.

6. The method of claim 1, wherein the pH in the batch reactor is controlled by an input flow rate of the basic aqueous solution.

7. The method of claim 1, wherein the discharge of the reaction solution is performed by using a tube including a filter.

8. A method of preparing a positive electrode active material for a lithium secondary battery, comprising:
   mixing a lithium-containing raw material with a positive electrode active material precursor prepared by the method of claim 1 to form a mixed resultant, and sintering the mixed resultant.

9. A positive electrode for a lithium secondary battery, comprising:
   a positive electrode active material prepared by the method of claim 8.

10. A lithium secondary battery comprising the positive electrode of claim 9.

11. The method of claim 1, wherein the positive electrode active material precursor particles have a $(D_{90}-D_{10})/D_{50}$ of 0.6 to 0.9.

* * * * *